(12) United States Patent
Penning

(10) Patent No.: US 7,146,714 B2
(45) Date of Patent: Dec. 12, 2006

(54) MANUFACTURING A MAGNETO-OPTICAL WRITE/READ HEAD

(75) Inventor: Frank Cornelis Penning, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 441 days.

(21) Appl. No.: 10/262,381

(22) Filed: Oct. 1, 2002

(65) Prior Publication Data

US 2003/0067845 A1    Apr. 10, 2003

(30) Foreign Application Priority Data

Oct. 5, 2001    (EP)    ................... 01203755

(51) Int. Cl.
*H01F 7/06* (2006.01)

(52) U.S. Cl. .................. 29/606; 29/603.07; 29/603.24; 29/603.26; 29/605; 29/831; 29/832; 29/846; 360/122; 360/126; 360/317; 369/13.17; 369/13.2; 369/300; 427/127; 427/128

(58) Field of Classification Search ............. 29/603.07, 29/603.24, 603.26, 605, 606, 831, 832, 838, 29/842, 846, 854, 857; 360/121–123, 126, 360/317; 369/13.17, 13.2, 300; 427/127, 427/128

See application file for complete search history.

(56) References Cited

U.S. PATENT DOCUMENTS 4,295,173 A * 10/1981 Romankiw et al. ......... 360/125
4,414,554 A * 11/1983 Springer .................... 346/74.5
5,293,360 A    3/1994 Hasegawa et al. ............. 369/13
5,978,319 A * 11/1999 Wang et al. ............. 369/13.23
6,584,045 B1 * 6/2003 Ishii et al. ............... 369/13.23

FOREIGN PATENT DOCUMENTS

JP    07240315 A *    9/1995

OTHER PUBLICATIONS

"2 GBits/in2 dual stripe MR heads"; Shi, X.; Ju, K.; Hagen, J.; Lin, C.L.; Han, C.C.; Chen, M.M.; Chang, J.W.; Wang; P.W.; Teng, E.; Magnetics, IEEE Transactions on vol. 33, Issue 5, Part 1, Sep. 1997 pp. 2896-2898.*

"An Integrated Magneto-Optical Sliding Head for First Surface Laser Pulsed Magnetic Field Modulation Magneto-Optical-Recording"; Frank C. Penning et al.Jpn. J. Appl. Phys. vol. 40 (2001) pp. 1775-1777, Part 1, No. 3B, Mar. 2001.

(Continued)

*Primary Examiner*—Paul Kim
(74) *Attorney, Agent, or Firm*—Michael E. Belk

(57) ABSTRACT

A method of manufacturing a digital magneto-optical signal write/read head including a thin-film in-plane magnetic coil disposed on an outwardly directed surface of a coil substrate. Coil lead in and coil lead out sections of the coil are extended to an interconnection part of the side surface of the coil substrate and first and second spaced interconnecting conductors are deposited on the side surface of the coil substrate in electrical connection with the lead in and lead out sections of the magnetic coil for contacting the external lead in and lead out lines. Alternatively first and second contacting conductors may additionally be deposited on a top surface of the coil substrate in electrical connection with the first and second interconnecting conductors on the side surface of the coil substrate for contacting the said external lead in and lead out lines.

13 Claims, 3 Drawing Sheets

OTHER PUBLICATIONS

Patent Abstracts of Japan, Kozu Nobuyuki: "Optical Head" Publication No. 2001067747, Mar. 16, 2001, Application No. 11237947, Aug. 25, 1999.

Patent Abstracts of Japan, Tanuma Toshio: "Method For Manufacturing Thin-Film Coil Element" Publication No. 2001184749, Jul. 6, 2001, Application No. 11367681, Dec. 24, 1999.

Patent Abstracts of Japan, Horibata Shinji: "Magnetic Head" Publication No. 02294903, Dec. 5, 1990, Application No. 01116523, May 9, 1989.

Patent Abstracts of Japan, Sekine Takehiko: "Magneto-Optical Recorder" Publication No. 04010202, Jan. 14, 1992, Application No. 02111281, Apr. 26, 1990.

Patent Abstracts of Japan, Iwabuchi Kietsu: "Magnetic Field Modulation Type Overwrite Magnetic Head" Publication No. 04074335, Mar. 9, 1992, Application No. 02188222, Jul. 17, 1990.

* cited by examiner

MANUFACTURING A MAGNETO-OPTICAL WRITE/READ HEAD

The invention relates to a method of manufacturing a magneto-optical write/read head.

A method and a write/read head of the above type are known from Reference [1] which is herewith incorporated into the present specification by reference. Further details relating to magneto-optical heads of the kind referred to above may be found in references [2] and [3] which herewith are also both incorporated into the present specification by incorporation and which were not yet published at the priority date of the present application.

The magneto-optical write/read head described in reference [1] comprises a sliding head with integrated focussing lens and magnetic field modulating coil which has been designed and manufactured by the authors of the reference. The sliding head is intended for use with high data rate, first surface magneto-optical recording. A coil is integrated into the air bearing surface of the slider to maintain a head-disk distance of around 1 micron.

A dual layer coil is described made in a thin film process on a glass coil substrate by growing galvanic Cu between photoresist walls. Insulation between the two coil layers is achieved by a thin oxide layer. Because in this embodiment the completed coil faces the rotating disk, the coil is also covered with a few microns of oxide in order to protect it from damage by incidental mechanical contact with the disk.

A problem in the manufacture of write/read heads of this kind or write/read heads is the provision of means for contacting the thin film magnetic coil by electrically connecting the coil lead in and lead out sections to external lead in and lead out lines which are needed for connecting the coil to the external electronic circuitry needed for sending signals to and receiving signals from the coil. The coil is located on the outwardly directed surface of the coil substrate while the lead in and the lead out lines need to be connected at the opposite side of the coil substrate to terminals spaced from the coil substrate. The very small air gap present between a thin film in-plane magnetic coil of this kind and a rotating magneto-optical disc is too small (in the order of 1 micron) to accommodate the external lead in aria lead out lines.

It is an object of the invention to provide a method of the kind described which overcomes the above indicated problems, is excellently suitable for the manufacture of digital magneto-optical signal write/read heads arid does not require cumbersome manufacturing steps such as making deep via holes through the coil substrate.

Extending the coil lead in and lead out sections of the magnetic coil on the outwardly directed surface of the coil substrate to an interconnection part of the side surface of the coil substrate can easily be effected concurrently with the deposition of the coil itself on the coil substrate. For the deposition of the interconnecting conductors on the side surface of the coil substrate and contacting conductors on the top surface of the coil substrate deposition techniques may be used which are well known in the art of replication techniques and do not require the making of via holes through the substrate. In this way digital magneto-optical signal write/read heads may be produced at low cost which are suitable for use with magneto-optical discs and which demonstrate a very small head-disc distance while the magnetic coil may be brought into contact with the external lead in and lead out lines by suitable contacting means such as bonding, welding or soldering at the lead in and lead out sections respectively provided on the side surface of the coil substrate or with first and second contacting conductors respectively on the top surface of the coil substrate.

Preferred embodiments involve the use of an auxiliary substrate to facilitate the handling of the delicate write/read heads of the invention and to facilitate the deposition of conducting material on the coil substrate in such a way that the interconnecting conductors on the side surface of the coil substrate are deposited such as to be in electrical contact with the coil lead in and lead out sections of the magnetic coil.

The coil substrate may be detachably arranged on the supporting surface of the auxiliary substrate by adhesive means provided between the outwardly directed surface of the coil substrate and the supporting surface of the auxiliary substrate.

An advantageous embodiment of the latter method according to the invention uses an auxiliary substrate. This embodiment is important in view of the ease of handling a number of write/read heads simultaneously during the steps of providing a mask over a part of the coil substrate and depositing conducting material on the coil substrate.

A highly interesting embodiment of the invention for use in a method of manufacturing a digital magneto-optical signal write/read head according to the invention includes providing first and second contacting conductors on the top surface of the coil substrate. In this way an optical lens part of an optical pick-up may be provided on the top surface of the coil substrate between the lead in and lead out conductors of the coil while any light focused through the lens may pass through the coil substrate unobstructed by the lead in and lead out conductors. This embodiment provides extended freedom of design compared to the write/read head known from reference [1] in that the optical lens part may be located eccentrically in relation to the central axis of the electromagnetic coil.

Further embodiments relate to digital magneto-optical write/read heads according to the invention, preferably manufactured by the method according to the invention.

The invention will now be described in more detail by way of non-limiting examples with reference to the drawings in which.

Figure 7:
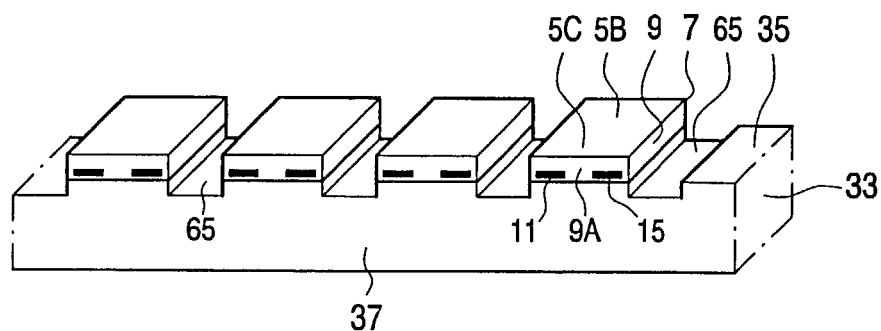
FIG. 7 is a partial perspective view of an auxiliary substrate strip with a number of coil substrates arranged on a supporting surface during a manufacturing step of the digital magneto-optical signal write/read head according to the invention.
Figure 8:
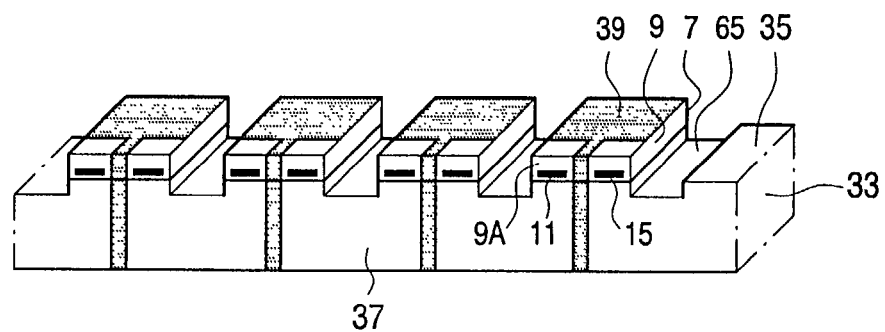
Figure 9:
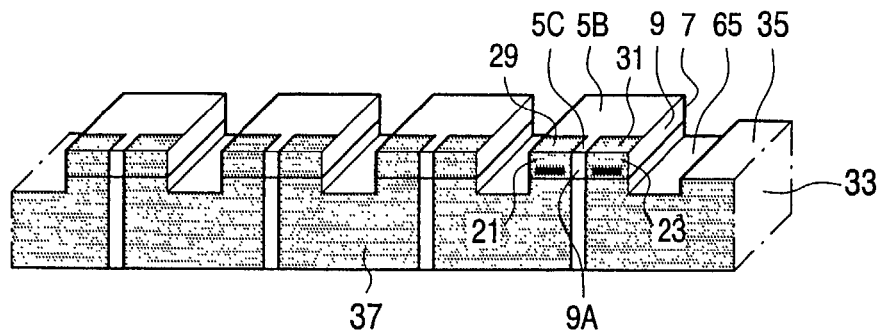

FIG. 8 is a partial perspective view according to FIG. 8 showing the position of a mask provided over the auxiliary substrate and a plurality of coil substrates during a further manufacturing step; and FIG. 9 is a partial perspective view similar to FIGS. 7 and 8 in which the mask has been removed and metal interconnecting conductors and contacting conductors have been deposited on the coil substrates.

The figures in the drawing have been drawn to an arbitrary scale while certain dimensions have been exaggerated for the purposes of illustration. The same reference numbers have been used in the figures to designate the same or similar parts in the different figures.

Figure 1:
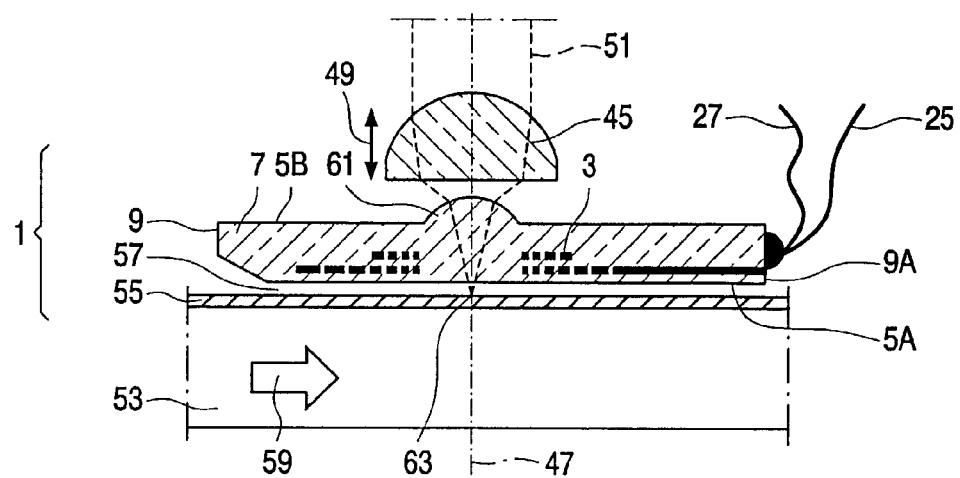
FIG. 1 is a schematic cross sectional view of a sliding disc digital magneto-optical signal write/read head according to the invention co-operating with an optical disc.

FIG. 1 schematically shows a digital magneto-optical signal write/read head 1 according to the invention. In the embodiment shown in FIG. 1 the magneto-optical signal write/read head 1 comprises an optical lens part 45 having a central axis 47. The lens part 45 may be moved up and down along the central axis 47, as symbolized by the double pointed arrow 49, by a focussing actuator (not shown in the drawing) used for focussing a laser beam 51 emitted from a suitable laser source. Focussing actuators suitable for this purpose are well-known by the person skilled in the art of optical and magneto-optical recording so that the focussing actuator, not forming part of the invention itself, will not be described in detail.

The magneto-optical signal write/read head 1 further comprises a coil substrate 7, having substantially parallel main surfaces 5A, 5B interconnected by a joining side surface 9. In the embodiment shown in FIG. 1 the coil substrate 7 is a light transparent slider of the kind described in reference [1] in combination with a magneto-optical disc 53 provided with a suitable magneto-optical storage layer 55. The coil substrate 7 is separated from the magneto-optical storage layer 55 by an air gap 57 which is dynamically generated by rotation of the magneto-optical disc 53 in the direction of the arrow 59, such that during operation a head-disc distance in the gap 57 is maintained of the order of 1 micron.

Figure 2:
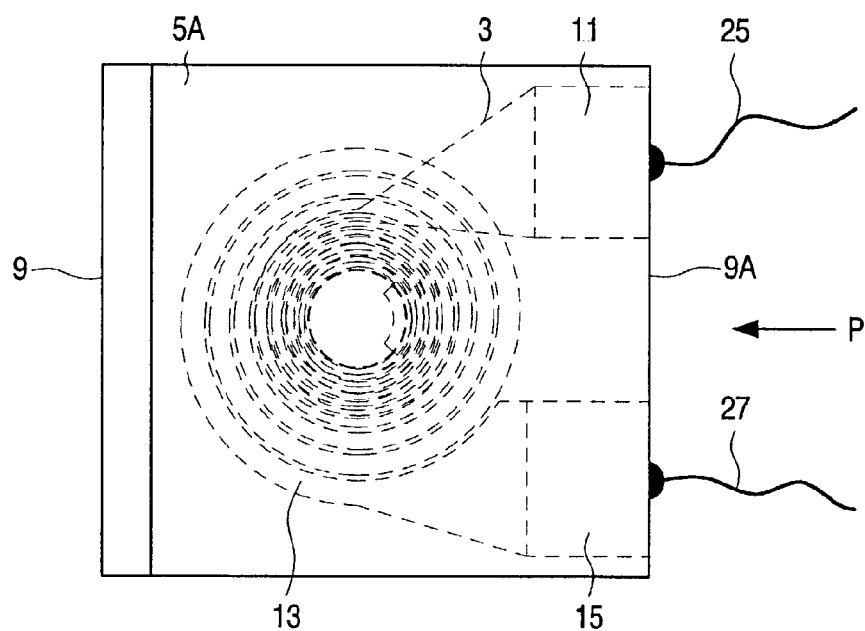
FIG. 2 is a plan view of the outwardly directed surface of the coil substrate of the write/read head of FIG. 1.
Figure 3:
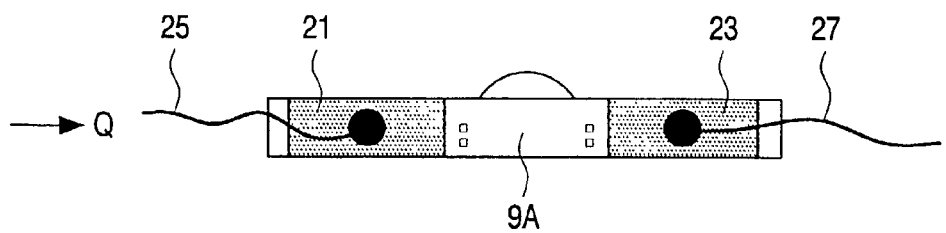
FIG. 3 is an elevational view along the arrow P in FIG. 2 of the interconnecting part of the side surface of the substrate of FIG. 2.

A thin film magnetic coil 3 is deposited on the outwardly directed surface 5A of the coil substrate 7, comprising a continuous electrical conductor pattern with a coil lead in section 11, a coil winding section 13 and a coil lead out section 15 (see also FIG. 2). Information about the method of manufacturing the thin film magnetic coil 3 and the lead in and lead out sections 11 and 15 may be found in reference [2] and will not be described here. The dimensions of the coil 3 are drawn to arbitrary scale. As shown in FIG. 1 the coil may consist of two layers on top of each other. The coil substrate 7 provided with the coil 3 in the embodiment shown in the FIGS. 1 to 5 and also in the embodiment shown in FIG. 6 is made of glass and is transparent to the laser beam 51. On the top surface 5B of the coil substrate 7 a second lens part 61 of the optical signal write/read head has been provided, the central axis of which substantially coincides with the central axis 47 of the lens part 45. The two lens parts 45 and 61 co-operate to focus the laser beam 51 into a focussing spot 63 on the surface of the magneto-optical storage layer 55 of the magneto-optical storage disc 53.

The whole digital magneto-optical signal write/read head 1 is suspended in a suitable unit that is very similar to a rotating or translating optical pick-up unit known from the prior art, provided with suitable suspension means for suspending the floating coil substrate 7 such as known per se for example from magnetic hard disc drive technology. Alternatively the coil substrate 7 could have a configuration different from that of a slider, for example for use with a stationary or slowly moving magneto-optical storage element instead of the magneto-optical storage disc 53. With such an embodiment no air film in the air gap 57 can be maintained and the coil substrate 7 could be actuated to move in the direction symbolized by the double pointed arrow 49 along the central axis 47 by a suitable actuator, for example an electromagnetic actuator of the kind well known from the prior art of electromagnetic actuators for optical and magneto-optical disc drives.

In the embodiment shown in FIG. 1 the laser beam 51 is focussed through a transparent coil substrate 7 through the centre of the coil 3. Alternatively the coil substrate 7 could be opaque and provided with a central opening at the centre of the thin film coil 3 for letting through the laser beam 51.

A description will now be given of the means for contacting the thin film magnetic coil 3 by electrically connecting the coil lead in and lead out sections 11, 15 to external lead in and lead out lines 25, 27 to and from the coil.

The coil lead in and lead out sections 11, 15 of the magnetic coil 3 on the outwardly directed surface 5A have been extended to an interconnection part 9A of the side surface 9 of the coil substrate 7. A pattern of respective first and second interconnecting conductors 21 and 23 has been provided by deposition on the interconnection part 9A of the side surface 9 of the coil substrate 7, in such a way that an electrical connection is provided to the lead in and lead out sections 11, 15 respectively of the magnetic coil 3. In the embodiment of the invention shown in FIGS. 1, 2 and 3, these interconnecting conductors have been used for contacting the external lead in and lead out lines 25, 27 respectively by suitable contacting means such as bonding, welding or soldering. In this way a lead in conductor is formed on the coil substrate 7 comprising the first interconnecting conductor 21 and the lead in section 11 respectively of the magnetic coil 3 and a lead out conductor is formed comprising the second interconnecting conductor 23 and the lead out section 15 respectively of the magnetic coil.

Figure 4:
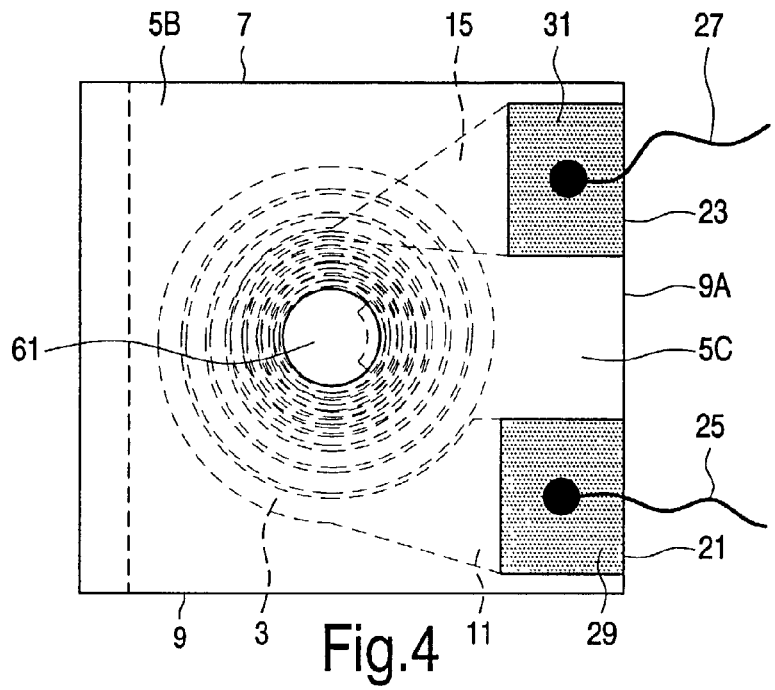
FIG. 4 is a plan view of the top surface of the coil substrate of FIG. 2.
Figure 5:
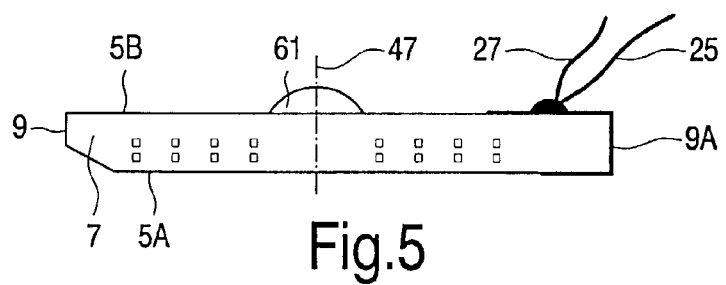
FIG. 5 is a side elevational view along the arrow Q in FIG. 3 of the coil substrate of FIG. 2.
Figure 6:
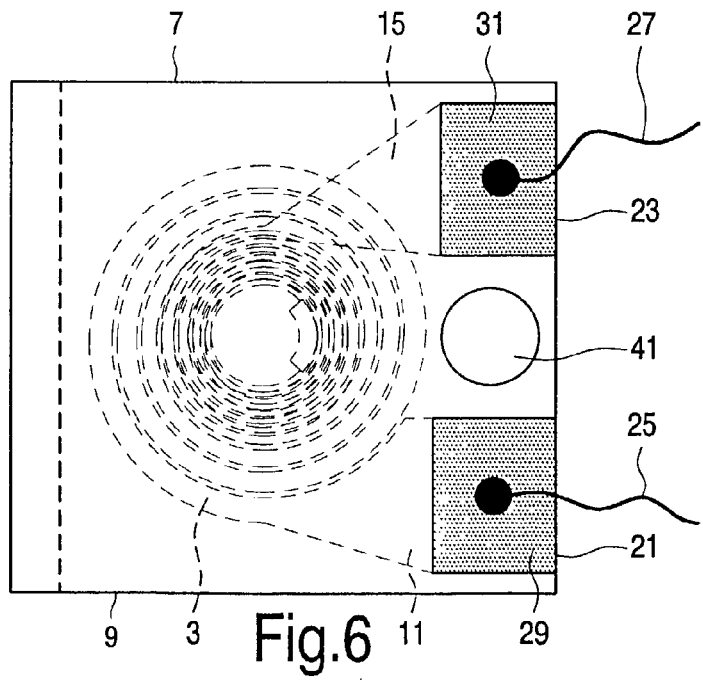
FIG. 6 is an elevational view similar to the elevational view of FIG. 4 but with a different position of a lens part of an optical pick-up.

In the embodiment according to FIGS. 4 and 5 an additional pattern of respective spaced first and second contacting conductors 29, 31 is provided on a contacting part 5C of the top surface 5B of the coil substrate 7 in electrical connection with the first and second interconnecting conductors 23, 24 respectively on the side surface 9 of the coil substrate 7 for contacting the said external lead in and lead out lines 25, 27 respectively by suitable contacting means such as bonding, welding or soldering. In this way a lead in conductor is formed comprising the first contacting conductor 29, the first interconnecting conductor 21 and the lead in section 11 respectively of the magnetic coil and a lead conductor is formed comprising the second contacting conductor 31, the second interconnecting conductor 23 and lead out section 15 respectively of the magnetic coil 3. With the embodiments of FIGS. 4 and 5 the lead in and lead out conductors 25, 27 respectively may be connected from the top instead of from the side as in FIGS. 1, 2 and 3. This may have advantages in certain embodiments.

FIG. 6 is a plan view of a sliding disc digital single write/read head, very similar to the one shown in FIG. 4, comprising a light transparent coil substrate 7. An optical lens part 41 is provided on the top surface 5B of the coil substrate 7 in a position between the lead in and lead out conductors 29, 21, 11 and 31, 23, 15 respectively in a substantially eccentric position relative to the centre of the thin film magnetic coil 3. The lens part 41 has been positioned such and the lead in and lead out conductors 29, 21, 11 and 31, 23, 15 respectively have been provided on the coil substrate 7 such that any light focussed through the lens part 41 passes through the coil substrate unobstructed by the lead in and lead out conductors 29, 21, 11 and 31, 23, 15 respectively.

The method of manufacturing the digital magneto-optical signal write/read head and more particularly the manufacture of the lead in and lead out conductors on the coil substrate thereof will now be described in more detail with reference more particularly to FIGS. 7, 8 and 9 of the drawings.

An auxiliary substrate 33, which in FIGS. 7, 8 and 9 is formed as a strip shaped auxiliary substrate, is provided having a supporting surface 35 and a joining auxiliary side surface 37. After depositing the thin film magnetic coil 3 on the outwardly directed surface 5A of the coil substrate 7 but prior to the steps of depositing the interconnecting conductors 21, 23 on the interconnection part 9A of the side surface of the coil substrate 7, the coil substrate 7 is detachably arranged on the supporting surface 35 of the auxiliary substrate 33, in a position in which the thin film magnetic coil 3 is directed to the supporting surface 35 and the interconnection part 9A of the side surface 9 of the coil substrate 7 is flush with the auxiliary side surface 37 of the auxiliary substrate 33. The coil substrate 7 may for example be detachably arranged on the supporting surface 35 of the auxiliary substrate 33 by a thin layer of removable adhesive means (not shown) disposed between the outwardly directed surface 5A of the coil substrate 7 and the supporting surface 35 of the auxiliary substrate 33.

Subsequently, see FIG. 8, a mask 39 is provided over a part of the interconnection part 9A of the side surface 9 and the adjoining part of the side surface 37 of the auxiliary substrate 33, such that the areas for disposing the interconnecting conductors 21, 23 remain exposed areas. In the embodiment of the method shown in FIGS. 8 and 9 the mask 39 is not only provided over a part of the interconnection part 9A of the side surface 9 but also over a part of the top surface 5B of the coil substrate 7 so that the areas for disposing the interconnecting conductors 31 and 23 as well as the areas for disposing the contacting conductors 29, 31 remain exposed areas. The embodiment shown in FIGS. 8 and 9 therefore is suitable for an embodiment of the coil substrate 7 in accordance with FIGS. 4 and 5.

The provision of the mask 39 may be effected by means of a manufacturing step well known in the prior art for providing conducting areas or stripes on substrates and will therefore not be described in detail. The material used for providing the mask 39 may also be entirely conventional and could consist of for example a suitable photoresist.

As a further manufacturing step a layer of conducting material is deposited over at least a part of the mask 39 and over the said exposed areas. Suitable processes for depositing a layer of conductive material are known from the prior art, such as galvanic processes or sputtering processes. Subsequently the mask 39 and any conducting material deposited thereon is removed (see FIG. 9) so that the pattern of spaced interconnecting conductors 21, 23 and contacting conductors 29, 31 remains on the interconnecting part 9A of the side surface 9 and the contacting part 5C of the top surface 5B respectively of the coil substrate 7.

As a last step the individual coil substrates 7 are removed from the auxiliary substrates 31, for example by melting or dissolving an adhesive layer provided between the detachably connected surfaces of the auxiliary substrate 33 and the individual coil substrates 7.

The individual coil substrates may have very small dimensions, for example length and width dimensions of the order of one or a few millimetres and a thickness of the order of 0.6 millimetres. Components having such small dimensions which need to be provided with thin film coils and deposited electrical conductors may be manufactured using manufacturing technology that is very similar to the prior art manufacturing technology used to manufacture for example thin film magnetic heads or chips. For example a wafer substrate of suitable shape could be provided, such as a glass substrate, on which a plurality of thin-film in-plane magnetic coils 3 may be deposited using suitable stepper replication techniques to produce a plurality of individual thin-film in-plane magnetic coils 3 each disposed on a corresponding coil substrate 7 provided in the wafer substrate.

An auxiliary substrate having dimensions in accordance with the wafer substrate could be disposed over the wafer substrate and over the thin-film in-plane magnetic coils. Subsequently, in a first dicing step, the wafer substrate may be diced in a first direction into individual wafer substrate strips comprising rows of coil substrates having thin-film in-plane magnetic coils deposited thereon while leaving the auxiliary substrate intact. In a second dicing step the auxiliary substrate and the said individual wafer substrate parts disposed thereover may be diced in a second direction different from the first direction into strip shaped auxiliary substrates 33 each supporting a plurality of diced individual wafer substrate parts comprising a coil substrate 7 and a thin-film in-plane magnetic coil 3 deposited thereon, the coil lead in and lead out sections 11,15 of each individual magnetic coil being formed such and the dicing steps being executed such that after the second dicing step a cross section of the lead in and lead out sections 11,15 is exposed at an edge of the interconnecting part 9A of a side surface 9 of the coil substrates 7.

In FIGS. 7 to 9 the strip shaped auxiliary substrates 33 show shallow grooves 65 which are present between the individual coil substrates 7 and which remain after the first dicing operation.

The manufacturing method which has been discussed with reference to FIGS. 7, 8 and 9 comprises the interesting feature that the coil lead in section 11 and the coil lead out section 15 are exposed at the edge of the interconnection part 9A of the side surface 9 after the second dicing operation. Providing the interconnecting conductors 21 and 23 on the side surface 9A of the coil substrate 7, which side surface 9A is flush with the side surface 37 of the auxiliary substrate 33, therefore automatically provides an electrical connection between the coil lead in section and coil lead out section and the first and second interconnecting conductors 21, 23 respectively.

Although the invention has been described in relation to a limited number of embodiments of the invention, it should be appreciated that the invention is by no means limited to the embodiments described but instead is limited only by the scope of the claims.

REFERENCE

[1] Japanese Journal of Applied Physics, Vol. 40 (2001), pp. 1775–1777, Part 1, No. 3B, March 2001
[2] European Patent Application Filing No. 00201412.4 (=PHNL000221)
[3] European Patent Application Filing No. 01200477.6 (=PHNL010093)

What is claimed is:

1. A method of manufacturing a magneto-optical write and/or read head, the method comprising the acts of:
   providing a coil substrate having substantially parallel main surfaces including an outwardly directed surface and an opposed top surface, interconnected by a side surface;
   depositing a coil on the outwardly directed surface of the coil substrate comprising a continuous electrical conductor pattern with a coil lead in sections a coil winding section and a coil lead out section;

providing means for contacting the coil by electrically connecting the coil lead in and lead out sections to external lead in and lead out lines;

extending the coil lead in and coil lead out sections to an interconnection part of the side surface of the coil substrate;

depositing a pattern of respective first and second interconnecting conductors on the interconnection part of the side surface in electrical connection with the lead in and lead out sections respectively for contacting the external lead in and lead out lines respectively such that a lead in conductor is formed comprising the first interconnecting conductor and the lead in section of the coil respectively, and a lead out conductor is formed comprising the second interconnecting conductor and the lead out section of the coil, respectively;

providing an auxiliary substrate having a supporting surface and an adjoining auxiliary side surface;

after depositing the coil on the outwardly directed surface of the coil substrate but prior to the acts of depositing the interconnecting conductors on the interconnection part of the side surface of the coil substrate, detachably arranging the coil substrate on the supporting surface of the auxiliary substrate in a position such that the coil is directed to the supporting surface and the interconnection part of the side surface of the coil substrate is flush with the auxiliary side surface of the auxiliary substrate;

providing a mask over at least a part of the interconnection part of the side surface such that areas for disposing the interconnecting conductors remain exposed areas;

depositing a layer of conducting material over at least a part of the mask and over the exposed areas;

removing the mask so that the pattern of spaced interconnecting conductors remains on the interconnecting part of the side surface of the coil substrate; and detaching the coil substrate from the auxiliary substrate.

2. The method according to claim 1, wherein the coil substrate is detachably arranged on the supporting surface of the auxiliary substrate by adhesive means disposed between the outwardly directed surface of the coil substrate and the supporting surface of the auxiliary substrate.

3. The method according to claim 1, further comprising the acts of:

providing a wafer substrate, depositing a plurality of in-plane magnetic coils on the wafer substrate to produce a plurality of individual in-plane magnetic coils each disposed on a corresponding coil substrate provided in the wafer substrate, disposing an auxiliary substrate over the wafer substrate, in a first dicing act, dicing the wafer substrate in a first direction into individual wafer substrate strips comprising rows of coil substrates having the in-plane magnetic coils deposited thereon while leaving the auxiliary substrate intact, and in a second dicing act, dicing the auxiliary substrate and the individual wafer substrate strips disposed thereover in a second direction different from the first direction into strip shaped auxiliary substrates, each supporting a plurality of diced individual wafer substrate parts comprising the coil substrate and the in-plane magnetic coil deposited thereon, the coil lead in and lead out sections of each individual magnetic coil being formed such and the dicing acts being executed such that after the second dicing act a cross section of the lead in and lead out sections is exposed at an edge of the interconnecting part of a side surface of the coil substrate.

4. A method of manufacturing a magneto-optical write and/or read head including a thin-film in-plane magnetic coil disposed on an outwardly directed surface of a coil substrate, the method including:

electrically isolating the coil substrate such that the coil substrate includes substantially parallel main surfaces including the outwardly directed surface and an opposed top surface and an adjoining side surface;

depositing a thin film magnetic coil on the outwardly directed surface of the coil substrate including a continuous electrical conductor pattern with a coil lead in section, a coil winding section and a coil lead out section;

contacting the thin film magnetic coil to external lead in and lead out lines by electrically connecting the coil lead in and lead out sections, including:

extending the coil lead in and coil lead out sections of the magnetic coil on the outwardly directed surface of the coil substrate to an interconnection part of the side surface of the coil substrate;

depositing a pattern of first and second spaced conductors on the interconnection part of the side surface of the coil substrate in electrical connection with the lead in and lead out sections respectively of the magnetic coil for contacting the external lead in and lead out lines respectively;

such that a lead in conductor is formed comprising the first interconnecting conductor and the lead in section of the magnetic coil respectively and a lead out conductor is formed comprising the second interconnecting conductor and the lead out section of the magnetic coil, respectively; the method including:

creating an auxiliary substrate having a supporting surface and an adjoining auxiliary side surface;

detachably arranging the coil substrate on the supporting surface of the auxiliary substrate in position such that the thin film magnetic coil is directed to the supporting surface and the interconnection part of the side surface of the coil substrate is flush with the auxiliary side surface of the auxiliary substrate;

forming a mask over at least a part of the interconnection part of the side surface such that the areas for disposing the interconnecting conductors remain exposed areas;

depositing a layer of conducting material over at least a part of the mask and over the exposed areas;

removing mask and any conducting material deposited thereon so that the pattern of spaced interconnecting conductors remains on the interconnecting part of the side surface of the coil substrate; and detaching the coil substrate from the auxiliary substrate.

5. The method according to claim 4, wherein the coil substrate is detachably arranged on the supporting surface of the auxiliary substrate by adhesive means disposed between the outwardly directed surface of the coil substrate and the supporting surface of the auxiliary substrate.

6. The method according to claim 4, further comprising the acts of:

providing a wafer substrate, depositing a plurality of thin-film in-plane magnetic coils on the wafer substrate using suitable stepper replication techniques to produce a plurality of individual thin-film in-plane magnetic coils each disposed on a corresponding coil substrate provided in the wafer substrate, disposing an auxiliary substrate over the wafer substrate, in a first dicing step dicing the wafer substrate in a first direction into individual wafer substrate strips comprising rows of coil substrates having thin-film in-plane magnetic coils deposited thereon while leaving the auxiliary substrate intact, and in a second dicing step dicing the auxiliary substrate and the individual wafer substrate strips disposed thereover in a second direction different from the first direction into strip shaped auxiliary substrates each supporting a plurality of diced individual wafer substrate parts comprising a coil substrate and a thin-film in-plane magnetic coil deposited thereon, the coil lead in and lead out sections of each individual magnetic coil being formed such and the dicing steps being executed such that after the second dicing step a cross section of the lead in and lead out sections is exposed at an edge of the interconnecting part of a side surface of the coil substrate.

7. A method of manufacturing a magneto-optical write and/or read head, the method comprising the acts of:

providing a coil substrate having substantially parallel main surfaces including an outwardly directed surface and an opposed top surface, interconnected by a side surface;

depositing a coil on the outwardly directed surface of the coil substrate comprising a continuous electrical conductor pattern with a coil lead in section, a coil winding section and a coil lead out section;

providing means for contacting the coil by electrically connecting the coil lead in and lead out sections to external lead in and lead out lines;

extending the coil lead in and coil lead out sections to an interconnection part of the side surface of the coil substrate;

depositing a pattern of respective first and second interconnecting conductors on the interconnection part of the side surface in electrical connection with the lead in and lead out sections respectively for contacting the external lead in and lead out lines, respectively, such that a lead in conductor is formed comprising the first interconnecting conductor and the lead in section of the coil respectively, and a lead out conductor is formed comprising the second interconnecting conductor and the lead out section of the coil, respectively; and depositing a pattern of respective spaced first and second contacting conductors on a contacting part of the top surface of the coil substrate in electrical connection with the first and second interconnecting conductors respectively for contacting the external lead in and lead out lines respectively.

8. The method of claim 7, further comprising the acts of:

providing an auxiliary substrate having a flat supporting surface and an adjoining auxiliary side surface;

after depositing the coil on the outwardly directed surface of the coil substrate but prior to the acts of depositing the interconnecting conductors on the interconnection part of the side surface of the coil substrate, depositing the contacting conductors on the contacting part of the top surface of the coil substrate, detachably arranging the coil substrate on the supporting surface of the auxiliary substrate in a position such that the coil is directed to the supporting surface and the interconnection part of the side surface of the coil substrate is flush with the auxiliary side surface of the auxiliary substrate;

providing a mask over at least a part of the interconnection part of the side surface and a part of the top surface of the coil substrate such that the areas for disposing the interconnecting conductors and contacting conductors remain exposed areas;

depositing a layer of conducting material over at least a part of the mask and over the exposed areas;

removing the mask and any conducting material deposited thereon so that the pattern of spaced interconnecting conductors and contacting conductors remains on the interconnecting part of the side surface and the contacting part of the top surface respectively of the coil substrate; and detaching the coil substrate from the auxiliary substrate.

9. The method of claim 7, wherein the coil substrate is transparent, and further comprising:

an optical lens part of an optical pick up formed on the top surface of the coil substrate in a position between the position of the lead in and lead out conductors, such that light focused through the lens part passes through the finished coil substrate unobstructed by the lead in and lead out conductors.

10. A method of manufacturing a head configured for at least one of reading and writing information of a storage medium, the medium comprising the acts of:

providing a coil substrate having substantially parallel main surfaces including an outwardly directed surface and an opposed top surface, interconnected by a side surface;

depositing a coil on a first surface of the coil substrate, said coil comprising a continuous electrical conductor pattern including a coil winding section, and coil lead in and coil lead out sections;

extending the coil lead in and coil lead out sections to interconnection conductors of a side surface of the coil substrate;

providing an auxiliary substrate having a supporting surface and an adjoining auxiliary side surface;

after depositing the coil on the first surface of the coil substrate, depositing contacting conductors on the on the first surface, detachably arranging the coil substrate on the supporting surface of the auxiliary substrate in a position such that the coil is directed to the supporting surface and the side surface of the coil substrate is flush with the auxiliary side surface of the auxiliary substrate;

providing a mask over at least a part of the interconnection conductors of the side surface and a part of the first surface of the coil substrate such that areas for disposing the interconnecting conductors and contacting conductors remain exposed areas;

depositing a layer of conducting material over at least a part of the mask and over the exposed areas;

removing the mask so that the pattern of spaced interconnecting conductors and contacting conductors remains on the side surface and the contacting part of the first surface respectively of the coil substrate; and detaching the coil substrate from the auxiliary substrate.

11. The method of claim 10, further comprising the act of connecting external lead in and lead out lines to said conductive interconnection conductors.

12. The method of claim 11, further comprising the act of depositing a pattern of respective first and second contacting conductors on the first surface of the coil substrate in electrical connection with the interconnecting conductors for contacting the external lead in and lead out lines, respectively.

13. The method of claim 10, further comprising the act of depositing a pattern of respective first and second contacting conductors on the first surface of the coil substrate in electrical connection with the interconnecting conductors.

* * * * *